United States Patent
Minkoff et al.

(10) Patent No.: US 7,026,989 B1
(45) Date of Patent: Apr. 11, 2006

(54) METHODS AND APPARATUS FOR SHAPING ANTENNA BEAM PATTERNS OF PHASED ARRAY ANTENNAS

(75) Inventors: John Minkoff, Englewood, NJ (US); Gene L. Cangiani, Parsippany, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/762,249

(22) Filed: Jan. 23, 2004

(51) Int. Cl.
*H01Q 3/00* (2006.01)
*H01Q 3/26* (2006.01)

(52) U.S. Cl. ..................................... 342/377; 342/372

(58) Field of Classification Search ........ 342/372–373, 342/377
See application file for complete search history.

(56) References Cited

U.S. PATENT DOCUMENTS

| | | | | |
|---|---|---|---|---|
| 2,596,492 | A * | 5/1952 | Lindenblad | 342/118 |
| 2,968,808 | A * | 1/1961 | Lindsay | 342/368 |
| 3,305,864 | A * | 2/1967 | Ghose | 342/370 |
| 3,340,530 | A * | 9/1967 | Sullivan et al. | 342/370 |
| 5,151,706 | A * | 9/1992 | Roederer et al. | 342/372 |
| 5,257,030 | A * | 10/1993 | Aoki et al. | 342/372 |
| 2002/0057225 | A1* | 5/2002 | Spirtus | 343/766 |

FOREIGN PATENT DOCUMENTS

WO  WO 01/19075 A2 * 3/2001

OTHER PUBLICATIONS

L.C. Godara, Application of antenna arrays to mobile communications. II. Beam-forming and direction-of-arrival considerations Proceedings of the IEEE , vol. 85(8), p. 1195-1245, Aug. 1997.*

B. Friedlander et al., Performance analysis of a null-steering algorithm based on direction-of-arrival estimation, IEEE Transactions on Acoustics, Speech, and Signal Processing, vol. 37(4), p. 461-466, Apr. 1989.*

A Jacobsen, Smart Antennas for Dummies, Telenor R&D Report, Jan. 2001.*

F.R. Castella et al., Optimized planar array antenna nulling with phase only control, 23rd European Microwave Conference Proceedings, vol. 1, p. 886-888, Sep. 1993.*

C. Drane Jr. et al., Gain maximization and controlled null placement simultaneously achieved in aerial array patterns, Radio-and-Electronic-Engineer (UK), vol. 39(1), p. 49-57, Jan. 1970.*

* cited by examiner

*Primary Examiner*—Thomas H. Tarcza
*Assistant Examiner*—F. H. Mull
(74) *Attorney, Agent, or Firm*—Edell, Shapiro & Finnan, LLC

(57) ABSTRACT

A method of forming an antenna beam with a phased array antenna having an array of antenna elements includes selecting angular directions at which nulls are to be located in an antenna radiation pattern of the phased array antenna, computing a radiation shaping transformation as a function of the selected angular directions, and determining from the radiation shaping transformation an amplitude and phase distribution over the array of antenna elements that forms the antenna beam with nulls of the antenna radiation pattern at the selected angular directions. Computing of the radiation shaping transformation involves constructing a set of vectors corresponding to the selected antenna radiation pattern nulls, and computing a matrix whose product with each of the vectors is zero. The amplitude and phase distribution is determined from the matrix.

28 Claims, 10 Drawing Sheets

METHODS AND APPARATUS FOR SHAPING ANTENNA BEAM PATTERNS OF PHASED ARRAY ANTENNAS

BACKGROUND OF THE INVENTION

1. Field of the Invention

The present invention relates to beamforming techniques for phased array antennas and, more particularly, to methods and apparatus for shaping antenna beam patterns.

2. Description of the Related Art

Phased array antennas are used in a wide variety of applications to transmit and receive directed beams of electromagnetic energy. The shape and direction of the antenna beam produced by such antennas are determined by the relative phases and amplitudes of the signals at the individual antenna elements that constitute the phased array. For example, where hardware permits the relative phases of the antenna elements to be adjusted during operation, the main lobe of the antenna radiation pattern can be steered over a range of different directions to transmit a signal in a selected direction or to receive a signal arriving from a particular direction.

It is customary to employ non-uniform illumination, sometimes referred to as amplitude tapering, over array apertures in order to alter radiation patterns from what they are with uniform illumination. Often, such amplitude tapering is used to reduce sidelobes in the resultant radiation patterns. With uniform illumination, although the boresight transmitted power is maximized, approximately twenty percent of the radiated power is transmitted into the sidelobes. With the use of tapered illumination functions, the power in the sidelobes can be reduced to a few percent of the total, with well over ninety percent being confined to the main beam. To date, no methods other than some form of tapering have been in use for these purposes.

The resultant tradeoff for reduction in sidelobe levels by means of tapering is an unavoidable broadening of the main beam relative to the uniform-illumination case, which reduces the array gain and, therefore, the transmitted and received power levels. Power reductions by one-half are typical. Accordingly, where sidelobe reduction is sought, it would be desirable to augment or replace conventional tapering techniques with techniques capable of achieving greater sidelobe reduction without a corresponding further broadening of the main beam and the attendant reduction in peak antenna gain. More generally, it would be desirable to have greater control over the shaping of the antenna radiation pattern produced by a phase-array antenna than that afforded by conventional techniques.

SUMMARY OF THE INVENTION

In accordance with a general aspect of the invention, a method of forming an antenna beam with a phased array antenna comprising an array of antenna elements includes: selecting a plurality of angular directions at which nulls are to be located in an antenna radiation pattern of the phased array antenna; computing a radiation shaping transformation as a function of the selected angular directions; and determining from the radiation shaping transformation an amplitude and phase distribution over the array of antenna elements that forms the antenna beam with nulls of the antenna radiation pattern at the selected angular directions. The radiation shaping transformation can be computed by constructing a plurality of vectors corresponding to the selected angular directions at which the nulls are to be located and computing a matrix whose product with each of the vectors is zero. For example, k angular directions can be selected at which nulls are to be located in an antenna radiation pattern of the phased array antenna. Subsequently, k vectors $v_n$ corresponding to selected antenna radiation pattern nulls are then constructed, and an M×M matrix A of rank M-k is computed that satisfies the equation $Av_n = 0$ for $n=1, \ldots, k$. The radiation shaping transformation computations can include performing a Gram-Schmidt orthogonalization procedure to determine the matrix A. The amplitude and phase distribution is then determined from the matrix.

The amplitude and phase distribution determined from the radiation shaping transformation can reduce sidelobe levels and increase main lobe power of the antenna radiation pattern relative to a uniform illumination radiation pattern. The radiation shaping transform can also be employed in combination with amplitude tapering designed to reduce sidelobe levels. Relative to amplitude tapering alone, the amplitude and phase distribution determined from the radiation shaping transformation can be configured to reduce the width of the main lobe of the antenna beam pattern, increase main lobe power, and reduce sidelobe levels. The antenna beam resulting from the radiation shaping transformation can be used either to transmit signals from the phased array antenna or to receive signals with the phased array antenna or both.

In another general aspect, an apparatus for forming an antenna beam can include: a phased array antenna comprising an array of antenna elements; a processor that computes a radiation shaping transformation as a function of selected angular directions at which nulls are to be located in an antenna radiation pattern of the phased array antenna; and an antenna element control module that controls amplitudes and phases of the antenna elements in accordance with the radiation shaping transformation to produce an amplitude and phase distribution over the array of antenna elements that forms the antenna beam with nulls of the antenna radiation pattern at the selected angular directions. The processor can compute the radiation shaping transformation by constructing a set of k vectors corresponding to the selected angular directions at which nulls are to be located, and computes an M×M matrix of rank M-k (where M is the number of antenna elements) whose product with each of the vectors is zero. The amplitude and phase distribution is then determined from the matrix.

The apparatus can further include a transmitter module that generates signals to be transmitted by the phased array antenna and/or a receiver module that processes signals received by the phased array antenna. The radiation shaping transformation can be used in transmission, reception or both to apply an amplitude and phase distribution to the antenna beam to control the angular location of the antenna beam pattern nulls.

The antenna element control module can include sets of phase control elements and amplitude control elements respectively corresponding to the antenna elements. The amplitude control elements can be variable attenuators or variable amplifiers, such as linear amplifiers or saturated amplifiers, and the phase control elements can be variable phase shifters.

In addition to the phase and amplitude distribution resulting from the radiation shaping transformation, the antenna element control module can apply amplitude tapering to the phased array antenna to reduce sidelobe levels of the antenna radiation pattern relative to a uniform illumination radiation pattern. The amplitude and phase distribution determined from the radiation shaping transformation can reduce the width of the main lobe of the antenna beam pattern, increase main lobe power, and reduce sidelobe levels relative to the antenna beam pattern achievable with amplitude tapering alone.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DESCRIPTION OF THE PREFERRED EMBODIMENTS

Figure 1:
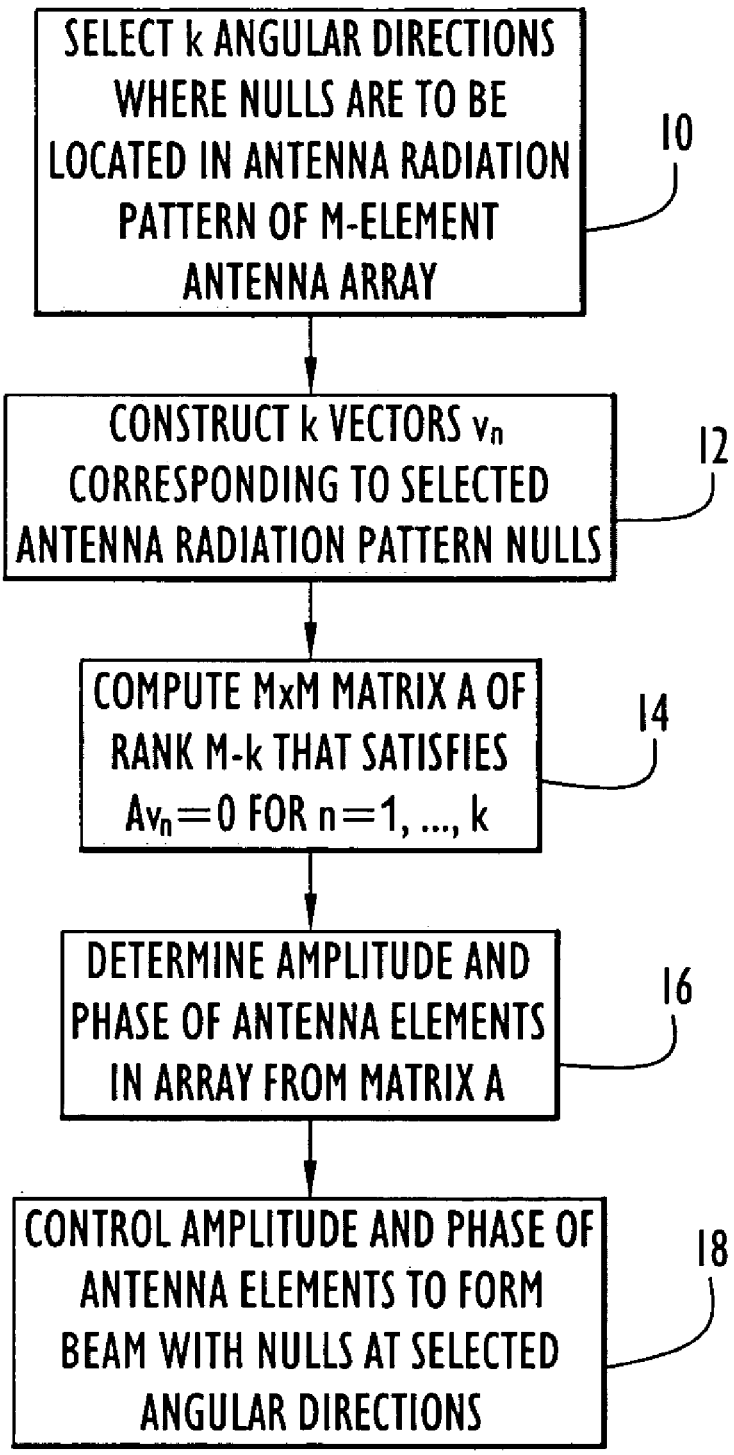
FIG. 1 is a functional flow diagram of a technique for shaping the radiation pattern of a phased array antenna by controlling the angular position of zeros in the antenna radiation pattern.

The following detailed explanations of FIGS. 1–10 and of the preferred embodiments reveal the methods and apparatus of the present invention. A new scheme for flexible shaping of radiation patterns is presented, with a wide range of possible applications. These include, but are not restricted to, array sidelobe reduction. For this application, improvement over existing conventional amplitude-tapering methods can be achieved in which greater reduction in sidelobe levels is achieved while maintaining main lobe widths less than or at most equal to those yielded by tapering methods alone.

As used herein, the terms antenna beam(s), or simply "beam(s)", refer generally to transmitted energy concentrated in a certain direction or a sensitivity or receptiveness of the antenna to signals arriving from particular directions. The antenna beam is formed by a directional antenna and is directed over a particular angular region in accordance with the antenna pattern (i.e., the radiated field intensity as a function of angle), resulting in a directed signal. The antenna beam may be fixed in a particular direction or may be electronically or mechanically steered over a range of directions. Typically, it is possible to electronically steer the antenna beam by controlling the relative phases of the signals transmitted by the individual antenna elements in the antenna array.

As used herein, the word "radiation" does not merely refer to transmission, but refers more broadly to transmit and receive antenna beams and beam patterns. Thus, for example, terms such as "radiation pattern" and "radiation shaping transformation," refer generally both to the transmission of signals and reception of signals. Likewise, terms such as antenna beam pattern and radiation pattern are used interchangeably and refer to both signal transmission and reception.

Radiation patterns necessarily exhibit regions of constructive and destructive interference, the latter being commonly referred to as the "zeros" or "nulls" of the pattern. The invention provides a method for placing the zeros in the pattern at arbitrary angular locations, which makes possible a very wide range of pattern variations. This is a new approach to antenna beam shaping that differs significantly from any form of conventional amplitude or phase tapering. For side-lobe attenuation applications, reduction of the order of 10 dB more than that achievable by tapering alone can be achieved, while simultaneously increasing the transmitted power in the main lobe by almost forty percent. In other applications, the scheme can be used in the generation of end-fire transmission beam patterns, or to form multiple high-gain beams.

An illumination function over an array of M elements can be viewed as an M-dimensional vector of complex elements, each such element representing the amplitude and phase of the electrical excitation at the corresponding array element. The illumination vector has components along the various line-of-sight directions from the array, which determine, for that illumination function, the power transmitted along the particular direction. The described scheme makes use of mathematics, such as Gram-Schmidt orthogonalization, to perform a null-spaced transformation for flexible shaping of radiation patterns. In particular, the effect of the transformation, denoted as Radiation Shaping Transformation (RST), on the illumination function is to transform to zero those vector components corresponding to those angular directions where it is desired to have nulls in the radiation pattern. The null-space transformation is essentially used to eliminate those vectors in the radiation pattern that need to be eliminated in order to achieve the pattern that is desired, one such example being the aforementioned sidelobe reduction. In applying RST, a known radiation pattern is modified by shifting the zeros to the desired angular locations. If production of a pattern with low sidelobe levels is the objective, the modification is applied to a radiation pattern that has already been modified by means of amplitude tapering.

Every radiation pattern has zeros or nulls in the far field, and the position of those nulls is dictated by the amplitude and phase distribution over the array. A basic principle of the disclosed scheme is to place the zeros or "nulls" of the radiation pattern at selected angular locations which can be chosen arbitrarily, depending on the application of interest. This can be accomplished as follows. Consider an M-element linear array with illumination vector:

$$a = [a_1\ a_2\ a_3\ \ldots\ a_M] \quad (1)$$

That is, $a_i$ is a complex number that represents the electrical excitation (phase and amplitude) at the $i^{th}$ array element. For this excitation, the far-field power radiated in the direction of an angle of incidence $\theta$ will be the magnitude squared of the inner product a v where the vector v is of the form:

$$v = \begin{bmatrix} 1 \\ e^{i\phi} \\ e^{i2\phi} \\ e^{i3\phi} \\ \vdots \\ e^{iM\phi} \end{bmatrix} \quad (2)$$

where $\phi = 2\pi f\tau \sin\theta$, f is the frequency and $\tau$ is the inter-element delay. In other words, the inner product of vectors a and v yields the relative power at a particular angle $\theta$ for that value of a.

The technique of the present invention makes it possible to put the nulls at any desired angle. When the inner product resulting from multiplying the antenna element excitation vector a by the vector v corresponding to a particular angle is space is zero, that excitation (i.e., that combination of phases and amplitudes across the antenna elements) will produce a null in the angular direction represented by the vector v.

Since each direction in the radiation pattern corresponds to a different vector, if a given such vector is replaced by the zero vector, a zero will be produced in that direction. This can be accomplished by introducing an M×M matrix A that satisfies the following expression:

$$Av = 0 \quad (3)$$

If the M×M matrix A is full rank, it has an inverse (i.e., it is non-singular), and the only solution is the trivial solution v=0. If, however, matrix A is rank deficient, it does not have an inverse (i.e., it is singular) and has a null space. In particular, if A is of rank M-k (k≤M−1), there are k non-zero vectors, which constitute the null space of A, that satisfy the k equations:

$$A\ v_n = 0 \quad n=1, 2, 3, \ldots, k \quad (4)$$

where the vectors $v_n$ are column vectors of the form of equation (2).

The matrix A is essentially a mathematical tool that can be used to determine the amplitude and phase to be applied to the individual antenna elements in the antenna array in order to place the nulls of the antenna radiation pattern at desired angles in space. The procedure for accomplishing this result is now described in connection with the flow diagram shown in FIG. 1. First, the k angular directions where nulls (or zeros) are to be located in the antenna radiation pattern of an M-element array are selected (operation 10 in FIG. 1). For an array containing M elements, up to M−1 antenna pattern nulls can be selected (i.e., the maximum possible value of k is M−1). Once the positions of the antenna radiation pattern nulls are selected, the k vectors $v_n$ corresponding to the nulls are constructed (operation 12). Each of the k vectors $v_n$, (n=1, 2, . . . , k) is in the form shown in FIG. 2. Specifically, the vector is an M×1 column of M values, where the values are computed in accordance with the expressions shown in FIG. 2 based on the signal frequency f, the inter-element delay $\tau$, and the desired angle of the null, $\theta$.

Typically, one is given a matrix and asked to determine the null space. In this case, a null space is specified, the k vectors $v_n$ specifying the selected directions of the zeros in the radiation pattern, and it is required to construct the M×M rank-deficient matrix A, of rank M-k, that satisfies the k equations shown in equation (4) (operation 14 in FIG. 3). The procedure for the construction of A is as follows. The matrix A is constructed by making use of a theorem from matrix algebra which states that if an M×M Hermitian matrix K has a k-fold repeated eigenvalue $\lambda$, the matrix K−$\lambda$I, where I is the M×M identity, has rank M-k.

Consider the M×M matrix K written in dyadic form as $$K = \sum_{m=1}^{k} v_m v_m^H \quad (5)$$

where H denotes Hermitian conjugate and the $v_m$ are an orthonormal set of M-element column vectors. The matrix K is Hermitian and has a k-fold repeated characteristic root equal to unity: the remaining roots are all zero. Therefore the matrix $$A = I - \sum_{m=1}^{k} v_m v_m^H \quad (6)$$

(sometimes called a projection matrix) is of rank M-k. The necessary $v_m$ are then determined by solving the equations $$AI_n = \left[I - \sum_{m=1}^{k} v_m v_m^H\right] i_n = 0 \quad n = 1, 2, \ldots k \quad (7)$$

or $$\sum_{m=1}^{k} (v_m, i_n) v_m = i_n \quad n = 1, 2, \ldots k \quad (8)$$

Thus, perhaps unexpectedly, in seeking the matrix A one arrives at a familiar Gram-Schmidt orthogonalization procedure.

Once the matrix A has been computed, in operation 16 (FIG. 1), the amplitude and phase of the antenna elements in the antenna array (i.e., the illumination function vector a) can be determined from matrix A as follows. As noted above, each point in the far-field radiation pattern of an array with excitation vector a can be thought of as the value of the inner product of the excitation row matrix a with an element of a continuum of vectors of the form $v_n$, each such element of the continuum representing a different angle of incidence from the array. Let this continuum be represented by the matrix Z. The matrix Z essentially includes k columns corresponding to the k vectors $v_n$ associated with the angular locations of the k selected nulls in the antenna beam pattern.

Then, by operating on Z by A, the product AZ yields a transformed continuum of vectors, in which the k selected vectors, and all components of all vectors along the k selected directions, have been transformed into the zero vector. The desired radiation pattern can then be written as:

$$aAZ \quad (9)$$

This expression would be suitable for a simulation calculation but not for an actual operational situation, since Z represents a radiated electromagnetic field. Note, however, that equation (9) can also be written as $$\{A \, a^H\}^H Z \quad (10)$$

where H denotes hermitian conjugate, which shows that the desired result can be achieved by operating with A on the array illumination vector. As another way of looking at it, since the vector a creates the radiation pattern, transforming those components of vector a into the zero vector that correspond to the directions selected for the zeros achieves the same result. In equation (10), one can write A instead of $A^H$ because A is Hermitian.

Recall that the illumination vector a is a set of complex numbers that represent the respective amplitudes and phases of an initial illumination function that is to be modified to produce the nulls at the desired angles. For example, for a uniform illumination, the illumination vector a is a series of 1's. By multiply the illumination vector a by the matrix A, the changes to the amplitudes and phases of the individual antenna elements required to produce the desired placement of the antenna pattern nulls are determined.

Thus, matrix A is a mathematical tool that permits one to determine the amplitude and phase to be applied to the individual antenna elements in the antenna array to yield nulls in the desired angular direction. Summarizing, some number of angles k that is less than the number of elements in the array can be defined as vectors at which antenna pattern nulls are desired, a matrix A having a rank corresponding to the number of desired nulls is computed as a function of the selected null vectors in zeros, and the computed matrix A is applied to the illumination vector a to determine the phase and amplitude profile of the antenna elements. Once the amplitudes and phases of the antenna elements that produce the desired nulls have been determined, the antenna beam is formed by setting the individual amplitudes and phases of the antenna elements accordingly (operation 18 in FIG. 1), for example by controlling attenuators and variable phase shifters associated with the individual elements.

The foregoing results actually apply only to a linear array. For a planar array, the illumination function is represented as a matrix W, and the matrix A must be applied to both the rows and columns. For the columns, the result is:

$$V = AW \quad (11)$$

and for the rows the result is:

$$U = AV^T \quad (12)$$

where T denotes transpose. The illumination function is therefore:

$$U^H = AWA \quad (13)$$

Figure 2:
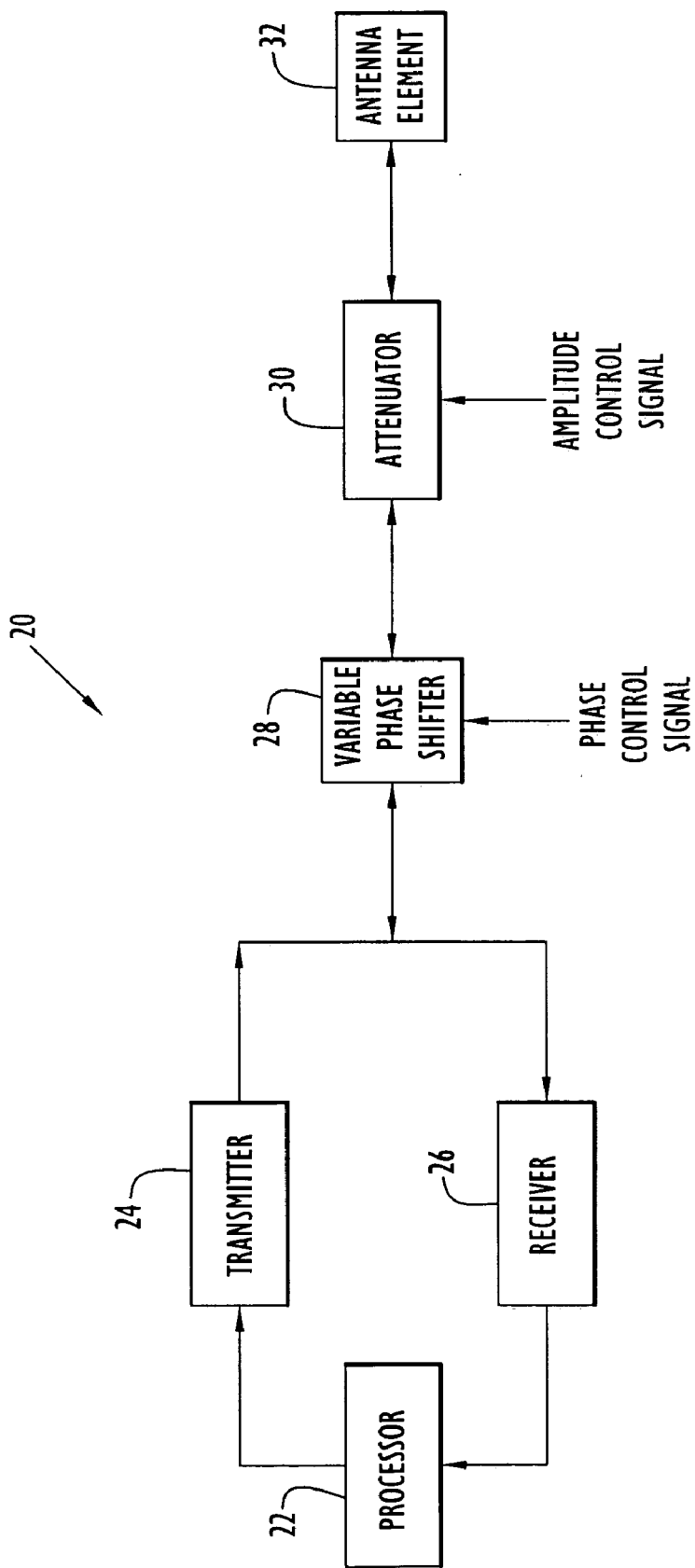
FIG. 2 is a block diagram of a communication device configured to implement shaping of the radiation pattern of a phased array antenna by controlling the angular position of zeros in the antenna radiation pattern.
Figure 3:
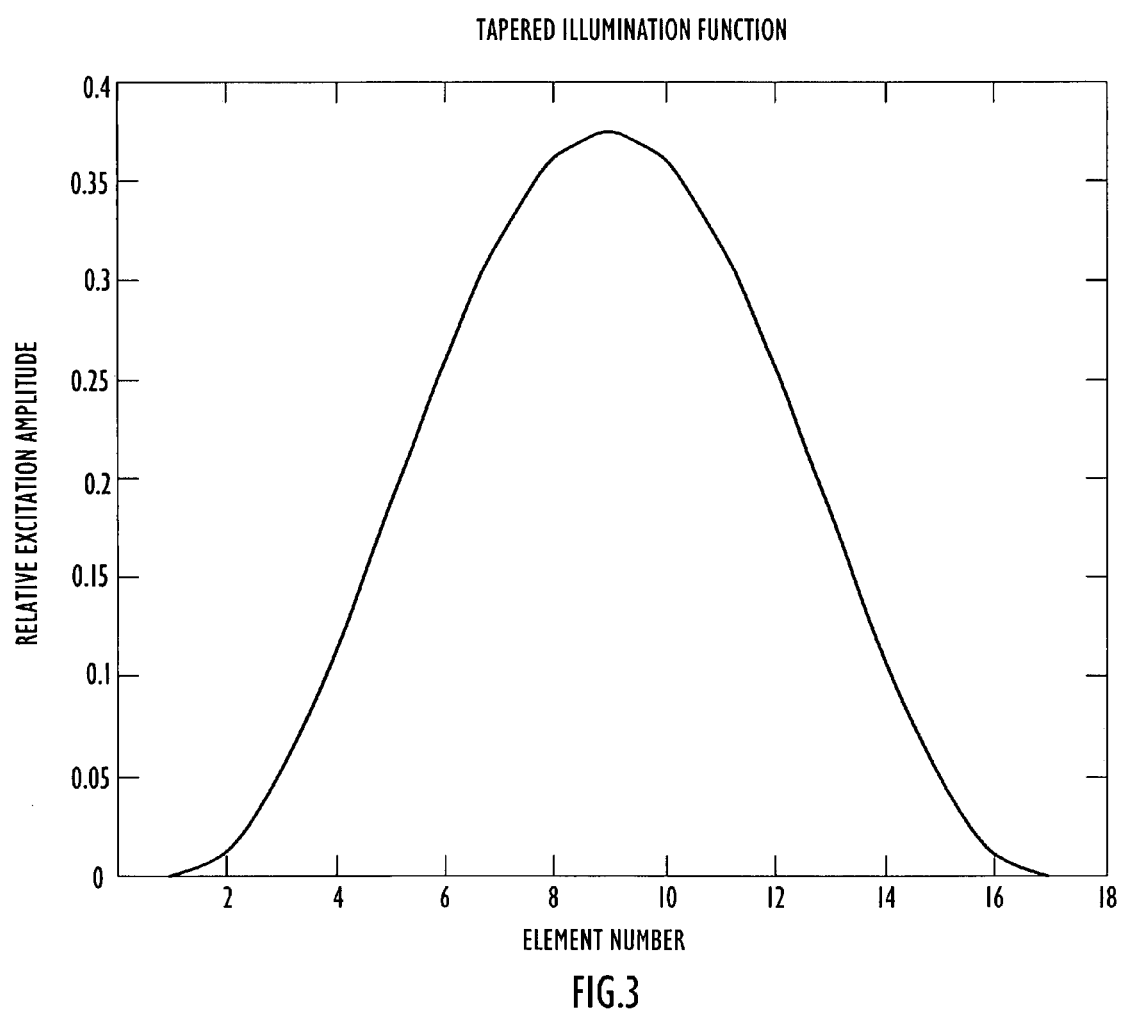
FIG. 3 is a graphical plot of an amplitude tapered illumination function across an array of elements that is to be modified in accordance with the radiation shaping transformation (RST) technique.
Figure 4:
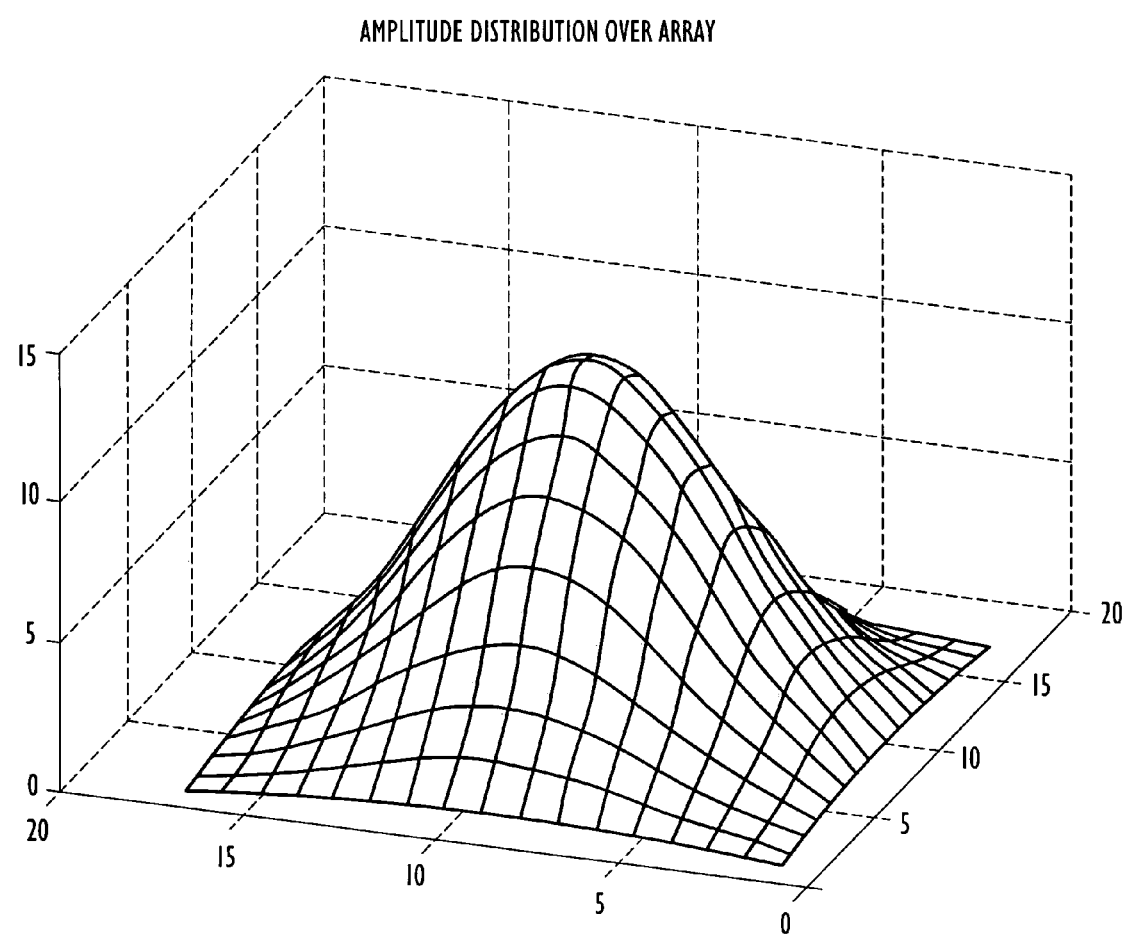
FIG. 4 is a three-dimensional plot of the amplitude distribution over an antenna array corresponding to an RST/tapered illumination function.
Figure 5:
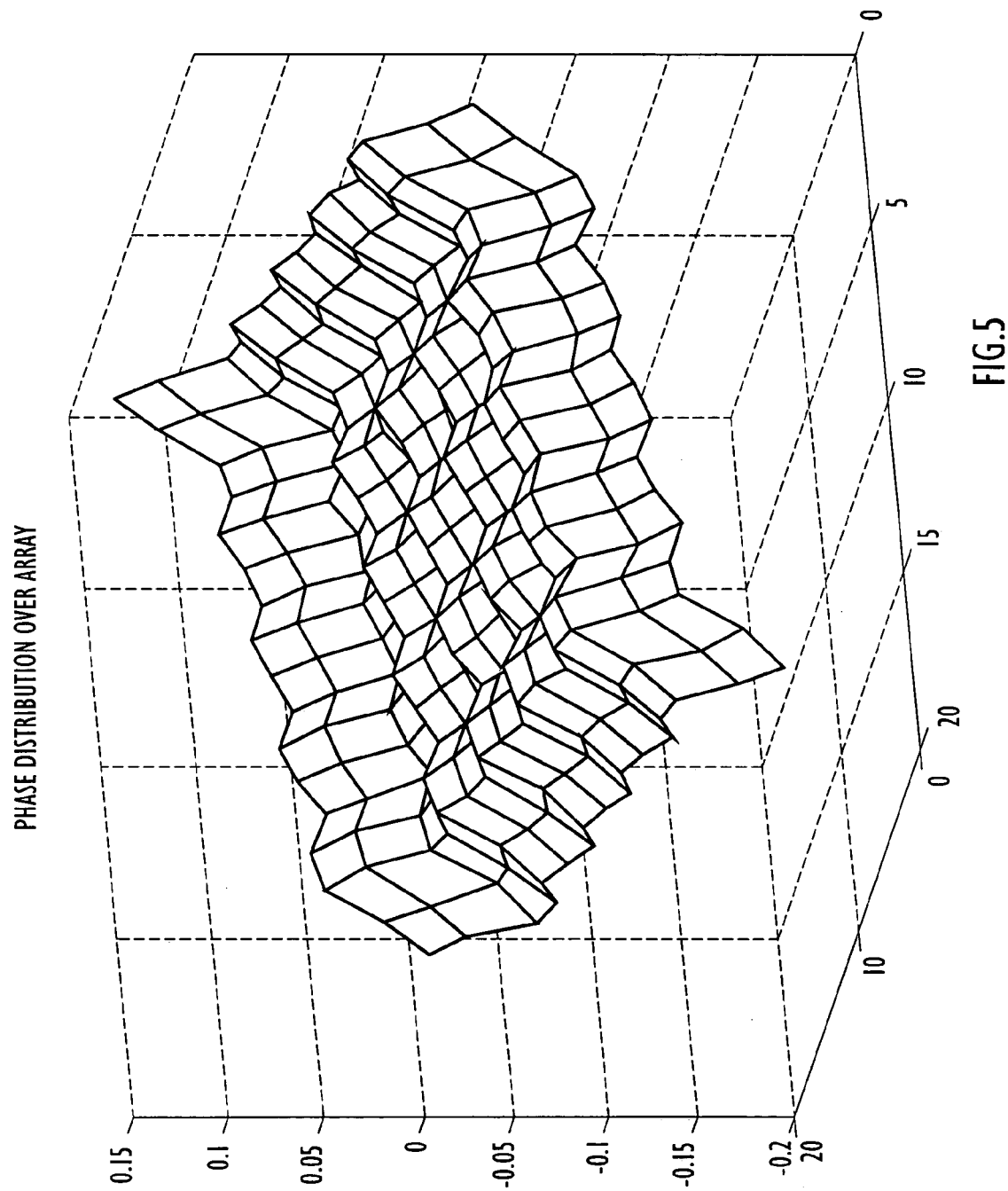
FIG. 5 is a three-dimensional plot of the phase distribution over an antenna array corresponding to an RST/tapered illumination function.

The described radiation shaping transformation (RST) technique for shaping antenna beam patterns can be implemented in any system employing a phased array antenna for transmitting and/or receiving electromagnetic signals, including communication, navigation and radar systems. FIG. 2 is a block diagram that conceptually illustrates the functional modules in a system 20 for transmitting and receiving signals using the RST technique. FIG. 2 is a conceptual diagram illustrating major functional units and overall architecture, and does not necessarily illustrate physical relationships. System 20 includes a processor responsible for supplying transmit signals to a transmitter 24, handling incoming signals processed by a receiver 26, and providing control to the front end hardware, including the antenna elements 32 and antenna element control modules. Each antenna element control module can include an amplitude control element and a phase control element, respectively depicted in FIG. 2 as an attenuator 30 and a variable phase shifter 28. Processor 22 can be implemented in single processor or a number of different processor that perform different functions. For simplicity, only one antenna element and one corresponding attenuator and phase shifter are shown in FIG. 2; however, it will be understood that processor 22, transmitter 24 and receiver 26 support a phased array antenna comprising an array of such antenna elements, each of which has an associated antenna element control module. Also, while the system of FIG. 2 includes both a transmitter and a receiver, the system optionally can include only a transmitter or only a receiver.

While attenuation and phase shifting are conceptually shown in FIG. 2 as being carried out with an attenuator and a variable phase shifter, it will be appreciated that the antenna element control module can be implemented using any mechanism that performs the phase and amplitude control required by the radiation shaping transformation technique. Further, the phase shifting and attenuation can be carried out using any suitable combination hardware and software, where the hardware is any suitable combination of digital and analog hardware. Thus, for example, amplitude control can be implemented using variable amplifiers, which can be linear amplifiers operating in the linear region or saturated amplifiers whose operating point, and hence saturation power, is adjustable. Accordingly, the attenuator and variable phase shifter depicted in FIG. 2 are merely one example of an implementation of an antenna element control module. Moreover, depending upon how the transmitter and receiver are configured, the functions of the antenna element control module can be integrated into the transmitter and/or receiver.

In the example shown in FIG. 2, when transmitting a signal, processor 22 supplies phase control signal to variable phase shifter 28 and supplies an amplitude control signal to attenuator 30 associated with each antenna element in coordination with the transmitter signal to transmit the signal in accordance with the radiation shaping transformation technique. Likewise, when receiving a signal, phase and amplitude control signals are supplied to the phase shifter and attenuator (or variable gain element) of each antenna element, such that the antenna receive pattern is shaped to achieve a desired sensitivity to signals arriving from particular angles while reducing sensitivity (e.g., lowering sidelobes) at other angles according to a selected RST function.

The results of applying the operations shown in FIG. 1 and described above were demonstrated in computer simulations. In applying RST, a known radiation pattern is modified by shifting the zeros to the desired angular locations. If production of a pattern with low sidelobe levels is the objective, the modification is applied to a radiation pattern that has already been modified by means of amplitude tapering. For example, a tapered illumination function that has been designed to produce a minimum amount of main-beam broadening with −30 dB first-sidelobe levels can be chosen, such as $(3/8)(1-x^2)^{5/2}$, where x measures the distance along the array. This tapering function is plotted in FIG. 3, and, for the directions selected for zeros in this example, the amplitude and phase distributions over the array corresponding to the RST/tapered illumination function are shown respectively in FIGS. 4 and 5.

Figure 6:
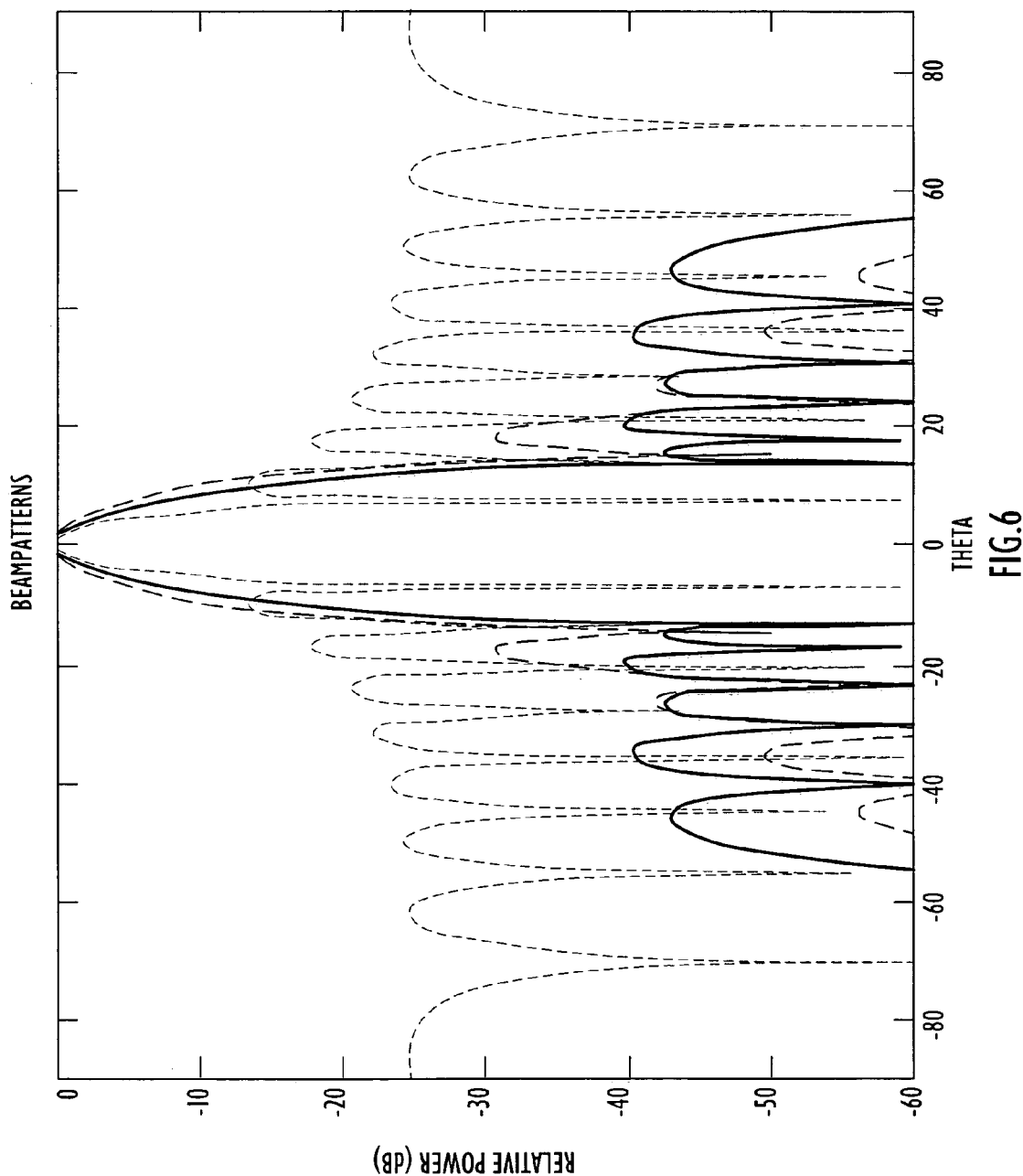
FIG. 6 is a graphical plot of the antenna beam patterns produced by a uniform illumination function, a tapered illumination function, and an RST/tapered illumination function, with power normalized to illustrate the relative sidelobe levels and main lobe beamwidths of the illumination functions.

The antenna radiation pattern produced by the RST/tapered illumination function is presented in FIG. 6 with a solid line, along with the antenna radiation patterns for uniform illumination (light dashed line) and tapering only (heavy dashed line). These plots have all been normalized in scale (power) to the maximum values at the polar angle θ=0 for ease of comparison. As seen in FIG. 6, the uniform illumination yields the minimum beamwidth and a maximum boresight antenna gain, but has high sidelobe levels. Comparing the tapering alone with RST/tapering it can be seen that the latter, while maintaining a main lobe width less than that of the former, also has essentially a uniform sidelobe level approximately 40 dB below the maximum, with the first sidelobe approximately 10 dB below the first sidelobe for tapering alone. Clearly, this represents an improvement yielded by RST/tapering, from the point of view of sidelobe reduction, over tapering alone, since the highest sidelobe levels have been dramatically reduce while at the same time the main lobe beamwidth has been reduced.

A more definitive quantitative measure of this improvement can be obtained as follows. The quantity $$\int_{\theta=0}^{\theta=\pi/2} \int_{\phi=0}^{\phi=2\pi} F(\theta, \varphi)\sin\theta \, d\theta \, d\varphi \quad (14)$$

where $F(\theta,\phi)$ is the square of the radiation pattern, represents the total power radiated by the array. Therefore, if the beam patterns are scaled such that the total power radiated by the tapered-only and the RST/tapered radiation patterns is equal, comparison of the scaled beam patterns yields a realistic quantitative comparison of the power distribution for the two cases as a function of angle.

Thus, comparison of the relative power contained in the main beam also results in significant power efficiency improvement afforded by RST/tapering versus tapering alone. In order to achieve the same boresight radiated power for the two cases, tapering alone would require thirty-eight percent more total power than would be required by RST/tapering. Utilizing RST in conjunction with tapering serves to confine more of the total radiated power to the main beam, resulting in less "wasted" power in the sidelobes, and providing much improved power efficiency.

Figure 7:
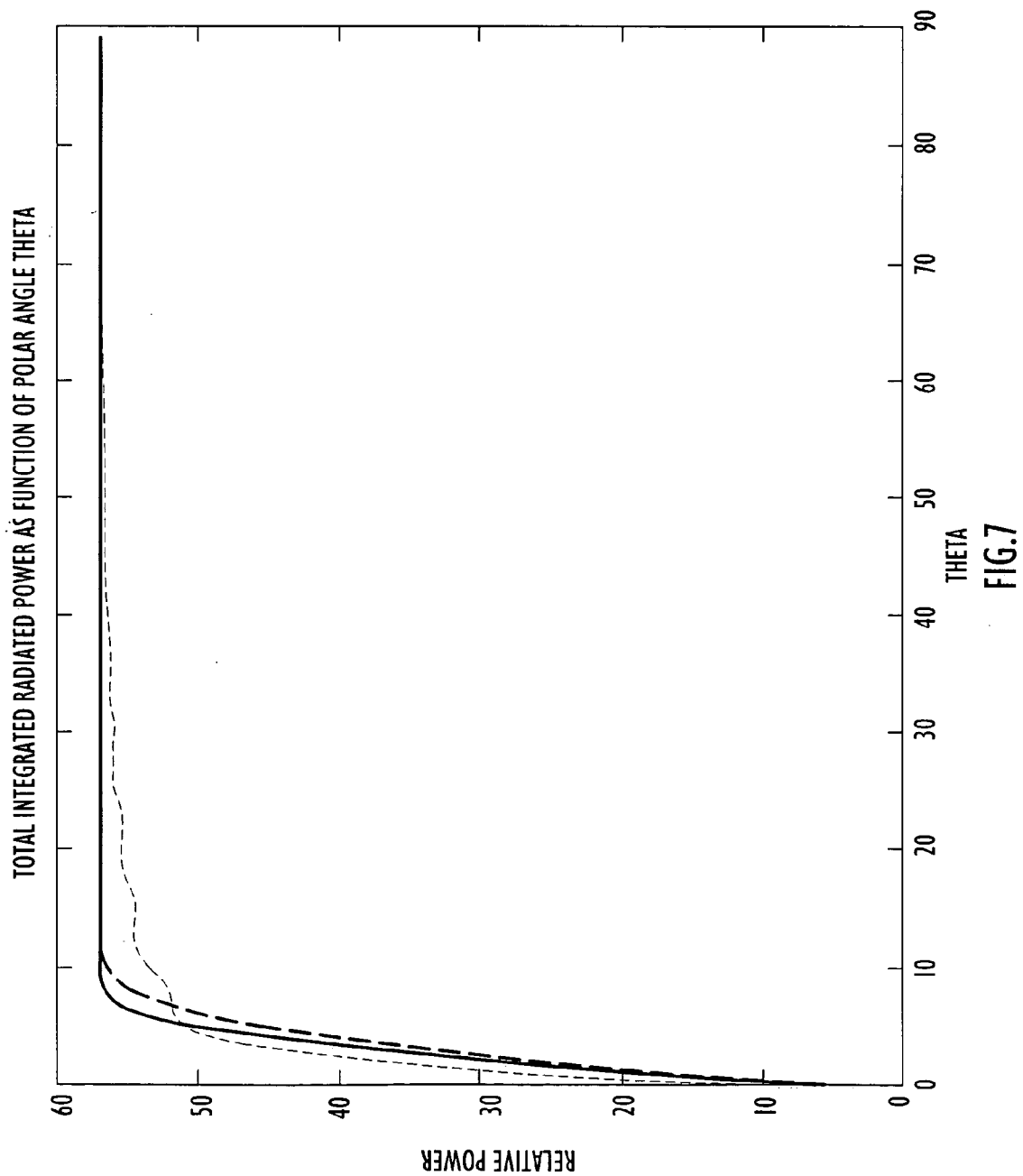
FIG. 7 is a graphical plot of the integrated total power distribution as a function of polar angle for the illumination functions shown in FIG. 6.
Figure 8:
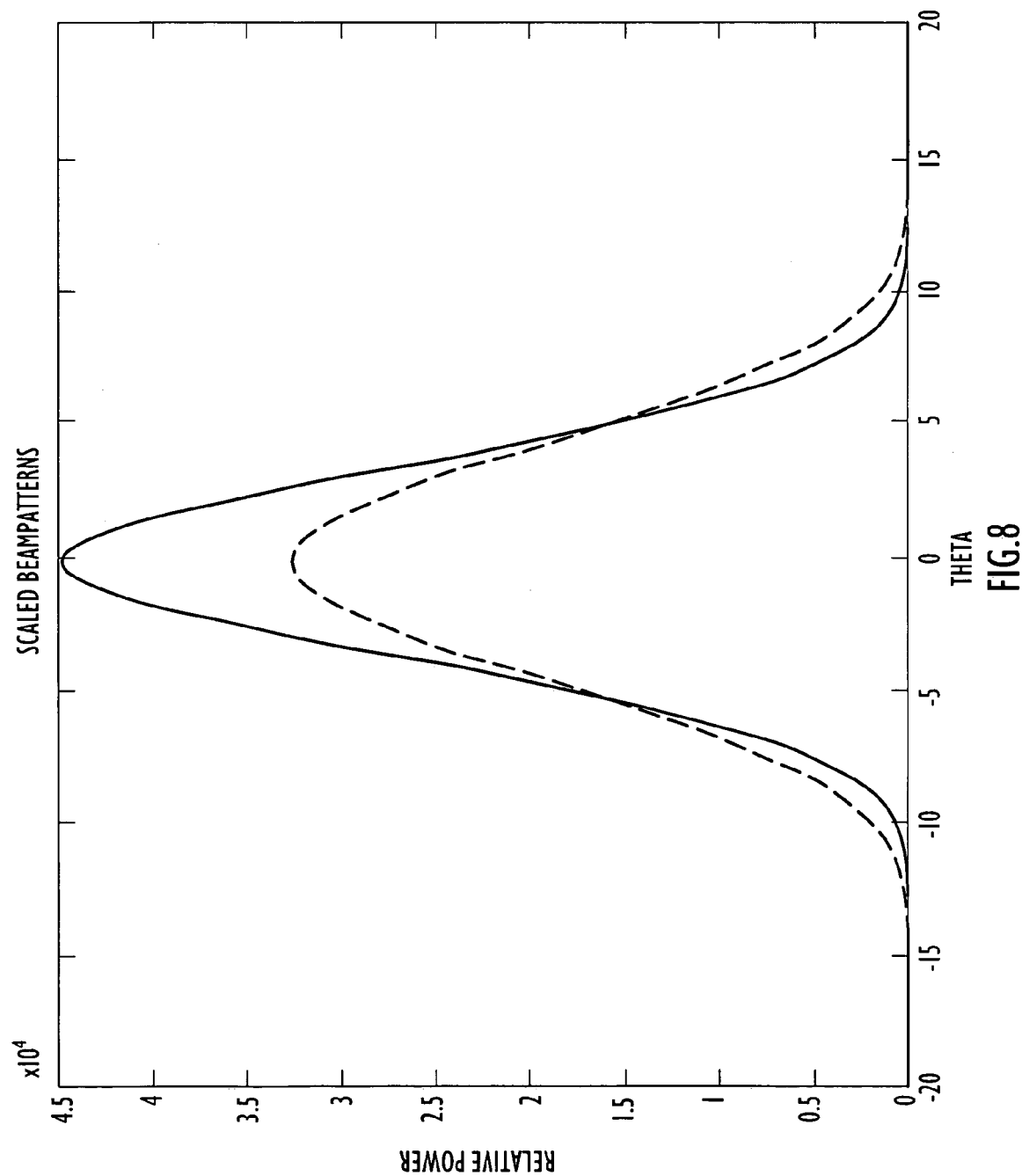
FIG. 8 is a graphical plot of the relative power resulting from the tapered illumination function versus the RST/tapered illumination function shown in FIG. 6 as a function of polar angle.

Plots of the integrated total power distribution as a function of polar angle θ for the three beam patterns shown in FIG. 6 are presented in FIG. 7. As seen in FIG. 7, the integrated power rises more quickly as a function of the angle θ for the RST/tapering illumination function than for the tapering-only illumination function, indicating that the power is more concentrated near boresight for the RST/tapering case, despite the lower near-in sidelobes. In FIG. 8, which illustrates the radiated power for the RST/tapering illumination function (solid line) and for the tapering-only illumination function (dashed line) as a function of angle, it can be seen that RST/tapering yields a substantial improvement in confining the radiated power to the main beam, with the boresight radiated power thirty-eight percent greater than for tapering alone. Thus, the RST/tapering illumination yields a higher peak antenna gain at boresight, narrows the beamwidth of the main lobe, increases the power in the main lobe, and lowers the sidelobe levels relative to the tapering-only illumination.

Figure 9:
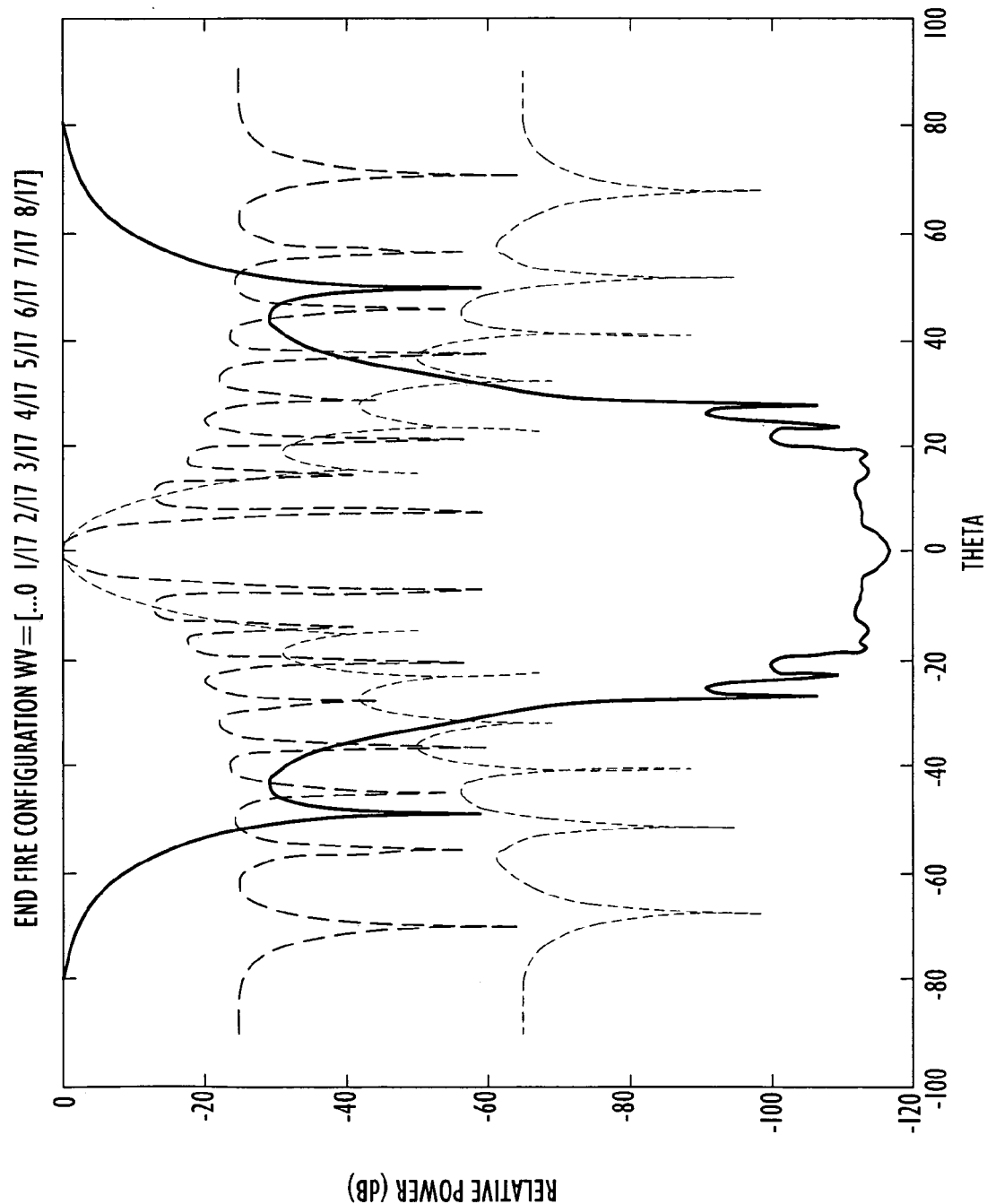
FIG. 9 is a power-normalized graphical plot of the antenna beam patterns produced by a uniform illumination function, a tapered illumination function, and an RST illumination function in which the zeros of the RST illumination function are grouped close to the main lobe.
Figure 10:
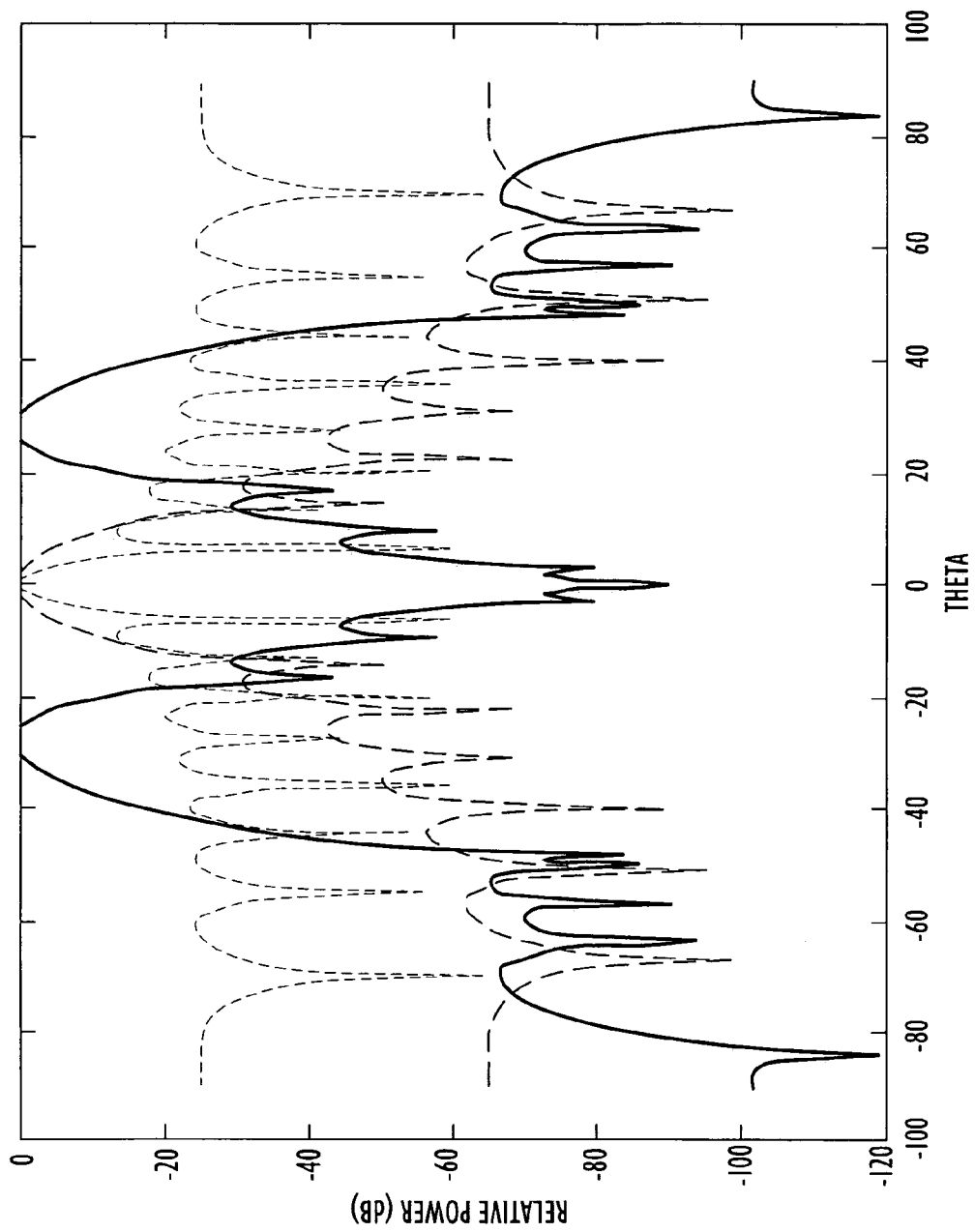
FIG. 10 is a power-normalized graphical plot of the antenna beam patterns produced by a uniform illumination function, a tapered illumination function, and an RST illumination function in which the zeros are positioned to produce two beams having substantially equal radiated power.

FIGS. 9 and 10 are presented for the purpose of demonstrating the flexibility of the RST scheme for shaping array radiation patterns without any specific application in mind. FIG. 9 presents an end-fire configuration, which is realized by grouping the antenna radiation pattern nulls close in, but outside of, the main lobe. In FIG. 10 a configuration is presented in which the radiated power is divided almost exclusively between two equal beams.

Virtually all applications that utilize directional antennas, such as phased array antennas, can benefit from utilization of the described RST technique. These application include, but are not limited to, communication, navigation, and radar systems, such as future generations of GPS, GPS augmentation systems, wireless telephony, satellite communication systems, the Global Multi-Mission Service Platform (GMSP), systems employing code division multiple access (CDMA) multiplexing and other communication systems.

The system of the present invention may be implemented using any of a variety of hardware and software configurations and is not limited to any particular configuration. For example, RF signal amplification and/or phase shifting can be performed within an integrated module containing the antenna element, or discrete amplifier or attenuator, phase shifter and antenna element components can be employed. The size of antenna array not limited to any particular number of radiating or receiving antenna elements and can be configured using any appropriate number and arrangement of antenna elements required to meet particular system requirements, such as beamwidth, scan angle, antenna gain, and radiated power.

Having described preferred embodiments of new and improved methods and apparatus for shaping antenna beam patterns of phased array antennas, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method of forming a transmit antenna beam with a phased array antenna comprising an array of antenna elements, the method comprising:

selecting a plurality of angular directions at which nulls are to be located in an antenna transmission pattern of the phased array antenna;

computing a radiation shaping transformation as a function of the selected angular directions by constructing a plurality of vectors corresponding to the selected angular directions at which the nulls are to be located and computing a matrix whose product with each of the vectors is zero; and determining from the radiation shaping transformation an amplitude and phase distribution over the array of antenna elements that forms the transmit antenna beam with nulls of the antenna transmission pattern at the selected angular directions, wherein the amplitude and phase distribution is determined from the matrix.

2. The method of claim 1, wherein the phased array antenna comprises M antenna elements, k angular directions are selected at which nulls are to be located, and the matrix is an M×M matrix of rank M-k.

3. The method of claim 1, further comprising:
applying amplitude tapering to the phased array antenna to reduce sidelobe levels of the antenna transmission pattern relative to a uniform illumination transmission pattern.

4. The method of claim 3, wherein the amplitude and phase distribution determined from the radiation shaping transformation reduces a width of a main lobe of the antenna transmission pattern relative to the width of the main lobe resulting from amplitude tapering without the amplitude and phase distribution determined from the radiation shaping transformation.

5. The method of claim 3, wherein the amplitude and phase distribution determined from the radiation shaping transformation increases main lobe power of the antenna transmission pattern relative to the main lobe power resulting from amplitude tapering without the amplitude and phase distribution determined from the radiation shaping transformation.

6. The method of claim 3, wherein the amplitude and phase distribution determined from the radiation shaping transformation reduces sidelobe levels of the antenna transmission pattern relative to sidelobe levels resulting from amplitude tapering without the amplitude and phase distribution determined from the radiation shaping transformation.

7. The method of claim 1, wherein the amplitude and phase distribution determined from the radiation shaping transformation reduces sidelobe levels of the antenna transmission pattern relative to a uniform illumination transmission pattern.

8. The method of claim 1, wherein the amplitude and phase distribution determined from the radiation shaping transformation increases main lobe power of the antenna transmission pattern relative to a uniform illumination transmission pattern.

9. The method of claim 1, wherein computing a radiation shaping transformation includes performing a Gram-Schmidt orthogonalization procedure.

10. A method of forming a transmit antenna beam with a phased array antenna comprising an array of antenna elements, the method comprising:
selecting a plurality of angular directions at which nulls are to be located in an antenna transmission pattern of the phased array antenna;
constructing a plurality of vectors corresponding to selected antenna radiation pattern nulls;
computing a matrix whose product with each of the vectors is zero; and
determining from the matrix an amplitude and phase distribution over the array of antenna elements that forms the antenna beam with nulls of the antenna transmission pattern at the selected angular directions.

11. A method of forming a transmit antenna beam with a phased array antenna comprising M antenna elements, the method comprising:
selecting k angular directions at which nulls are to be located in an antenna transmission pattern of the phased array antenna;
constructing k vectors $v_n$ corresponding to selected antenna transmission pattern nulls;

computing an M×M matrix A of rank M-k that satisfies $Av_n=0$ for n=1, . . . , k;
determining from matrix A an amplitude and phase distribution over the array of antenna elements that forms the transmit antenna beam with nulls at the selected angular directions.

12. An apparatus for forming a transmit antenna beam, comprising:
a phased array antenna comprising an array of antenna elements;
a processor that computes a radiation shaping transformation by constructing a plurality of vectors corresponding to selected angular directions at which nulls are to be located in an antenna transmission pattern of the phased array antenna and computing a matrix whose product with each of the vectors is zero; and
an antenna element control module that controls amplitudes and phases of the antenna elements in accordance with the radiation shaping transformation to produce an amplitude and phase distribution over the array of antenna elements that forms the transmit antenna beam with nulls of the antenna transmission pattern at the selected angular directions, wherein the amplitude and phase distribution is determined from the matrix.

13. The apparatus of claim 12, wherein the antenna element control module comprises a plurality of phase control elements and amplitude control elements respectively corresponding to the antenna elements.

14. The apparatus of claim 13, wherein the amplitude control elements are variable attenuators.

15. The apparatus of claim 13, wherein the amplitude control elements are variable amplifiers.

16. The apparatus of claim 13, wherein the amplitude control elements are linear amplifiers.

17. The apparatus of claim 13, wherein the amplitude control elements are saturated amplifiers.

18. The apparatus of claim 13, wherein the phase control elements are variable phase shifters.

19. The apparatus of claim 12, wherein the phased array antenna comprises M antenna elements, k angular directions are selected at which nulls are to be located, and the matrix is an M×M matrix of rank M-k.

20. The apparatus of claim 12, wherein the antenna element control module applies amplitude tapering to the phased array antenna to reduce sidelobe levels of the antenna radiation transmission pattern relative to a uniform illumination transmission pattern.

21. The apparatus of claim 20, wherein the amplitude and phase distribution determined from the radiation shaping transformation reduces a width of a main lobe of the antenna transmission pattern relative to the width of the main lobe resulting from amplitude tapering without the radiation shaping transformation.

22. The apparatus of claim 20, wherein the amplitude and phase distribution determined from the radiation shaping transformation increases main lobe power of the antenna transmission pattern relative to the main lobe power resulting from amplitude tapering without the radiation shaping transformation.

23. The apparatus of claim 20, wherein the amplitude and phase distribution determined from the radiation shaping transformation reduces sidelobe levels of the antenna transmission pattern relative to sidelobe levels resulting from amplitude tapering without the radiation shaping transformation.

24. The apparatus of claim 12, wherein the amplitude and phase distribution determined from the radiation shaping transformation reduces sidelobe levels of the antenna transmission pattern relative to a uniform illumination transmission pattern.

25. The apparatus of claim 12, wherein the amplitude and phase distribution determined from the radiation shaping transformation increases main lobe power of the antenna transmission pattern relative to a uniform illumination transmission pattern.

26. The apparatus of claim 12, further comprising a transmitter module that generates signals to be transmitted by the phased array antenna, wherein the phased array antenna transmits via the antenna beam the signals generated by the transmitter module.

27. The apparatus of claim 12, wherein, in computing the radiation shaping transformation, the processor performs a Gram-Schmidt orthogonalization procedure.

28. An apparatus for forming a transmit antenna beam, comprising:

a phased array antenna comprising an array of antenna elements;

means for computing a radiation shaping transformation by constructing a plurality of vectors corresponding to selected angular directions at which nulls are to be located in an antenna transmission pattern of the phased array antenna and computing a matrix whose product with each of the vectors is zero; and means for controlling amplitudes and phases of the antenna elements in accordance with the radiation shaping transformation to produce an amplitude and phase distribution over the array of antenna elements that forms the transmit antenna beam with nulls of the antenna transmission pattern at the selected angular directions, wherein the amplitude and phase distribution is determined from the matrix.

\* \* \* \* \*